(No Model.)
T. B. ZELLER.
ANIMAL TRAP.
No. 272,507.  Patented Feb. 20, 1883.
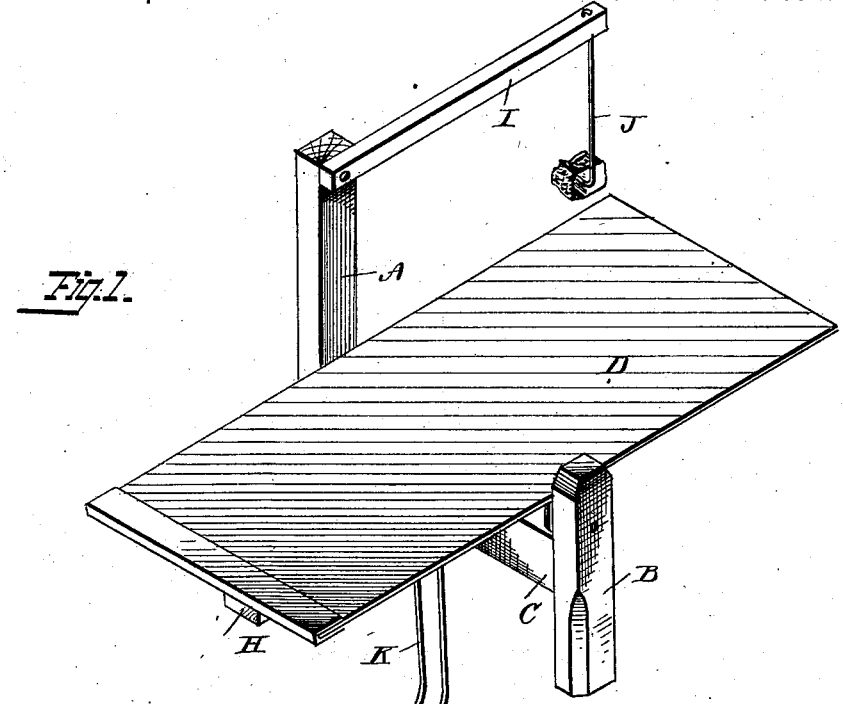
Fig. 1.
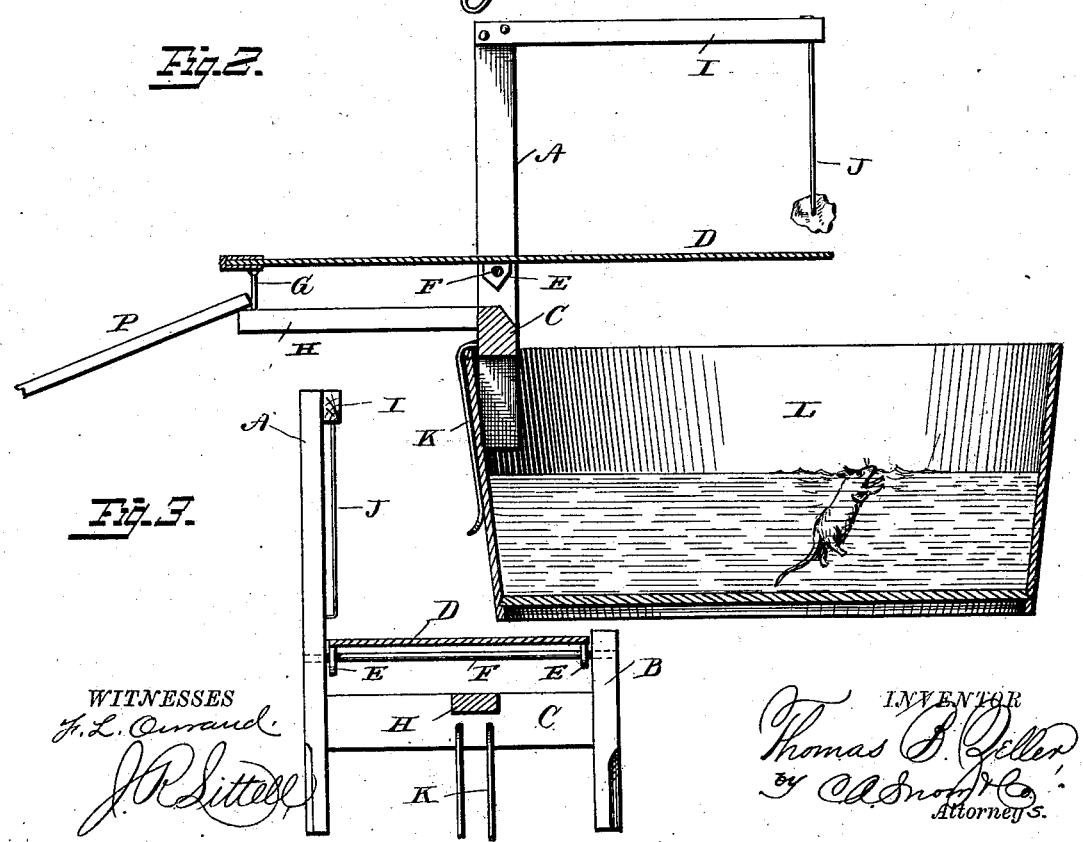
Fig. 2.
Fig. 3.
WITNESSES
F. L. Ourand.
J. R. Littell.
INVENTOR
Thomas B. Zeller
By C. A. Snow & Co.
Attorneys.

UNITED STATES PATENT OFFICE.

THOMAS B. ZELLER, OF CENTRE ROAD STATION, ASSIGNOR OF ONE-HALF TO JOHN C. GEHR, OF GEHRTON STATION, PENNSYLVANIA.

ANIMAL-TRAP.

SPECIFICATION forming part of Letters Patent No. 272,507, dated February 20, 1883.

Application filed November 21, 1882. (No model.)

*To all whom it may concern:*

Be it known that I, THOMAS B. ZELLER, a citizen of the United States, residing at Centre Road Station, in the county of Crawford and State of Pennsylvania, have invented a new and useful Animal-Trap, of which the following is a specification, reference being had to the accompanying drawings.

Figure 1 is a perspective view of my improved animal-trap. Fig. 2 is a vertical sectional view, showing the same set, ready for operation; and Fig. 3 is a transverse vertical sectional view.

The same letters refer to the same parts in all the figures.

This invention relates to that class of animal-traps which are self-setting, so that as soon as a victim is caught the trap is immediately automatically reset; and it consists in the improved construction of a simple, inexpensive, and effective device, as will be hereinafter fully described, and particularly pointed out in the claims.

In the drawings, A and B represent two uprights, connected some distance above their lower ends by a cross piece or brace, C.

D is a trap-door, made of wood, sheet metal, or other suitable material, and provided on both sides, near its center, with downward-projecting lugs E E, by which it is pivoted upon a rod, F, connecting the uprights A B just above the brace C. The front end of the trap-door D is slightly heavier than its rear end, and rests upon a stud, G, which projects upwardly from a bracket, H, secured to and extending in a forward direction from the cross piece or brace C, thus supporting the trap-door D in a horizontal position. The upright A has at its upper end a rearwardly-extending bracket, I, carrying a hook, J, to receive the bait, which by said hook is suspended directly over the rear end of the trap-door. The cross piece or brace C is provided with a centrally-located downward-projecting wire spring, K.

In operation the trap is set by securing it upon the rim or edge of an ordinary tub, or tin or earthenware vessel, L, which is partly filled with water, the device being clamped upon the rim of said vessel, as shown, by the lower ends of the uprights A and B and the spring K. A board or plank, P, is then placed in an inclined position and leading from the floor to the bracket H, against which it rests in such a manner as not to interfere with the operation of the trap-door D. Suitable bait being secured upon the hook J, the trap is then ready for operation. In passing up the inclined plank P and out upon the trap-door D, in order to reach the bait, the victim soon loses its balance and is precipitated into the water, while the trap-door instantly and automatically returns to its original horizontal position.

I claim as my invention—

1. The combination, with the frame having a spring or holder by which it may be attached to the rim of a tub or vessel, of the pivoted trap-door and the bait-hook suspended over the swinging end of the latter, as set forth.

2. The combination, with the frame A B C, having bracket H, provided with stud G, and bracket I, provided with bait-hook J, of the pivoted trap-door D, resting in a horizontal position upon the stud G, as set forth.

3. The combination, with the animal-trap, consisting essentially of the frame A B C, having trap-door D and bracket H, provided with stud G, of the inclined plank P, resting upon the said bracket H, as set forth.

In testimony that I claim the foregoing as my own I have hereto affixed my signature in presence of two witnesses.

THOMAS BENTON ZELLER.

Witnesses:
 ROBT. ANDREWS,
 GUSTAVUS BROWN.